L. B. Tyng.
Railroad Rail Joint.
Nº 34,452.   Patented Feb. 18, 1862.
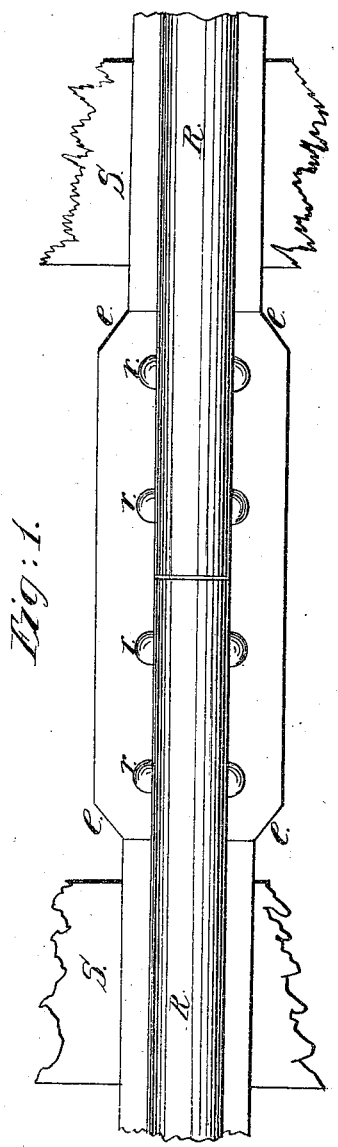
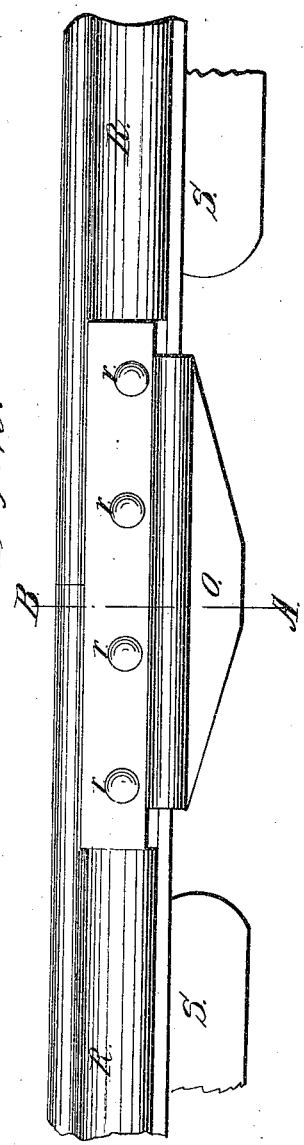
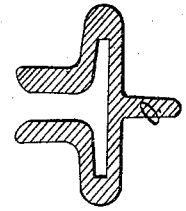
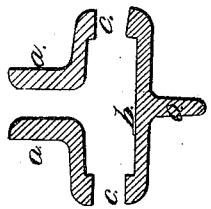
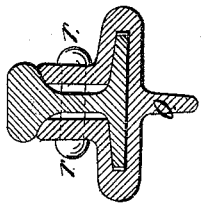
Witnesses
Horatio G. Corliss
Isaac Place
Inventor:
Levi Bartlett Tyng

UNITED STATES PATENT OFFICE.

LEVI BARTLETT TYNG, OF LOWELL, MASSACHUSETTS.

IMPROVEMENT IN RAILROAD JOINTS OR CHAIRS.

Specification forming part of Letters Patent No. 34,452, dated February 18, 1862.

*To all whom it may concern:*

Be it known that I, LEVI BARTLETT TYNG, of Lowell, in the county of Middlesex and State of Massachusetts, have invented a new and useful Improvement in Rail-Joints for Railroads; and I do hereby declare that the following is a full and exact description thereof, reference being had to the accompanying drawings, and to the letters of reference marked thereon.

The nature of my improvement or invention consists in the peculiarity and construction of a coupling which receives, connects, and supports the ends of railroad-rails in such a manner as to make the rails on which it is used practically equivalent to one continuous rail throughout a line of road, and thereby secures to the cars and rolling machinery a smooth and easy motion, as is hereinafter set forth.

To enable others skilled in the art to make and use my invention, I will proceed to describe its construction and operation.

Figure 1 represents a plan or top view of a rail-joint with my coupling. Fig. 2 represents a side elevation of the same; Fig. 3, a cross-section on line A B, Fig. 2. Fig. 4 represents cross-sections of three bars of iron of which the coupling is made, and Fig. 5 shows a cross-section of the coupling before it is applied to the rails.

The bars of iron $a\ a\ b$ are drawn by rolls to the forms represented in Fig. 4 and to the sizes required for the couplings they are to make. They are then cut into pieces of the requisite length for the couplings, which may be from twelve to eighteen inches long, according to the size of the rails on which they are to be used. The bar $b$, which composes the lower portion of the coupling, has a rib $o$ formed longitudinally upon its bottom side for the purpose of stiffening the joint in an upright line. This bar may be cut one or two inches shorter than the bars $a\ a$, which compose the upper portion of the coupling. This arrangement makes the bearing-surface of the coupling more equal upon the upper and under sides of the rail's base. The bars $a\ a$, which form the upper portion of the coupling, are drawn so as to make the upright angle about double the thickness of the horizontal angle, which may be three-eighths of an inch thick. The upright or thick angles of these bars form the jaws of the coupling and clamp the stem of the rails. After the bars are cut to their proper lengths they are put into a furnace arranged for the purpose and heated to a welding heat, when they are arranged in relation to each other, as shown in Fig. 4, and solidly united at their points $c\ c$ by a hammer into one piece, which is then forced onto a mandrel of the exact size and shape to make the coupling fit the rails on which it is to be used. The coupling while upon the mandrel is then passed under a hammer with dies, where its outside receives a true shape and smooth finish. The mandrel is then withdrawn and the coupling taken to shears, where its corners $e\ e\ e\ e$, Fig. 1, and bottom corners of the rib $o$, Fig. 2, are clipped off. It is then placed in a drilling-machine, where holes are drilled through its jaws for the bolts or rivets $r\ r\ r\ r$, which bind the coupling to the rails and tie the latter together. The coupling is then applied to the rails in the following manner: The rails R R are placed in position upon the sleepers S S, Figs. 1 and 2. The coupling is then forced upon the contiguous ends of the two rails, half its length upon each rail, the ends of which are prepared with holes through their stems to correspond to the holes in the coupling and to receive the rivets $r\ r\ r\ r$, which are then set. This completes the joint, which is placed and suspended between the sleepers, as represented in the drawings.

The novelty of my rail-joint consists in the combination of the useful and necessary features embraced in the coupling which connects and supports the rail ends. The joint being suspended, it has no sleeper directly under it to give it support, as is generally the case with rail-joints. It is therefore necessary that the coupling which connects the rails should be so constructed as to not only connect the rails, but to give the joint the necessary support and to make it as strong and stiff as the rail itself. To meet these conditions and also to make the application of the coupling to the rails easy and cheap, it embraces the following provisions, to wit:

First. To give the joint its proper strength and stiffness in an upright line, I form and construct the lower part or base of the coupling with a longitudinal stiffening-rib $o$, which may be of any convenient form and so proportioned in depth and otherwise as to make the joint as strong and stiff and at the same time as elastic as the rail itself. I consider this stiffening-rib an important feature in my coupling.

Second. I construct the upper portion or the jaws of the coupling which clamp the stem of the rails as thick and rigid as the width of the rail-head will allow of and make their outer sides flush with the sides of the rail-head. This stiffness and rigidity in the coupling-jaws are needed to resist the strain of the rivets when they are set and likewise to present a large bearing-surface as a seat for the rail-head, so as to secure that point of bearing against wear or working loose; but this thickness and stiffness in the jaws are more especially necessary to support and stiffen the joint in a lateral or horizontal line and make its strength in that direction equal to that of the rails.

Third. To secure an easy and close fit of the coupling to the rails, I construct its bow which clasps the rail's base about three-eighths of an inch thick, or one-half as thick as its jaws which clamp the stem of the rails, so that when the coupling is forced onto the rails and the rivets are set it shall spring sufficiently in the bow to accommodate itself to any slight variation in the size of the rails and closely hug and fit both the upper and under sides of the rail's base without a delay or expense of cutting either coupling or rails to make a fit, as would be necessary to do if the coupling were as thick and rigid in the bow as it is in its jaws. This feature in the coupling greatly facilitates its application to the rails, which generally have a slight variation in size even when drawn under the same rolls.

The combination of the three foregoing features in a rail-coupling composed of a single piece of iron are the characteristics which distinguish my coupling from all others. This coupling can be constructed in other ways and embrace the same features; but I consider the method herein set forth the best and most economical way of producing the device. It is manifest that with this coupling rail-joints may be suspended between sleepers and embrace a strength, smoothness, and elasticity quite equal to the rail itself, and thus render them practically equivalent to a continuous rail, which is a great desideratum in securing a smooth and easy-riding road, so desirable for the comfort of railroad travel and economy in working the road.

Having fully described my improvement in rail-joints, its construction, operation, and novelty, what I claim therein as my invention, and desire to secure by Letters Patent, is—

1. A rail-coupling constructed and consisting of a single piece embracing the combination of features, substantially as herein set forth, and its combination with railroad-rails—that is to say, a stiffening-rib $o$, formed and constructed longitudinally in or upon the base of a rail-coupling composed of a single piece having a spring-bow to clasp the rail-base and jaws to clamp the rail-stem and rivet or bolt thereto. I do not intend by this to limit my invention and claims to the particular form and construction of rib represented in the drawings, but to such form or forms and construction of rib as may be most convenient and will produce the same effect.

2. The combination of the rigid jaws with a spring-bow in the aforesaid rail-coupling, substantially as herein set forth.

LEVI BARTLETT TYNG.

Witnesses:
HORATIO G. F. CORLISS,
ISAAC PLACE.